United States Patent
Bhatt et al.

(10) Patent No.: US 9,521,145 B2
(45) Date of Patent: Dec. 13, 2016

(54) METHODS AND APPARATUSES TO PROVIDE SECURE COMMUNICATION BETWEEN AN UNTRUSTED WIRELESS ACCESS NETWORK AND A TRUSTED CONTROLLED NETWORK

(75) Inventors: Yogesh Bhatt, Santa Clara, CA (US); Sashidhar Annaluru, Bangalore (IN); Mukesh Garg, Cupertino, CA (US)

(73) Assignee: Mitel Mobility Inc., Richardson, TX (US)

( * ) Notice: Subject to any disclaimer, the term of this patent is extended or adjusted under 35 U.S.C. 154(b) by 67 days.

(21) Appl. No.: 13/326,191

(22) Filed: Dec. 14, 2011

(65) Prior Publication Data
US 2013/0097418 A1    Apr. 18, 2013

Related U.S. Application Data

(60) Provisional application No. 61/627,792, filed on Oct. 17, 2011.

(51) Int. Cl.
| | |
|---|---|
| H04L 29/06 | (2006.01) |
| H04W 12/02 | (2009.01) |
| H04W 12/08 | (2009.01) |
| H04W 76/02 | (2009.01) |
| H04W 36/14 | (2009.01) |

(52) U.S. Cl.
CPC .......... *H04L 63/0892* (2013.01); *H04W 12/02* (2013.01); *H04W 12/08* (2013.01); *H04W 76/022* (2013.01); *H04L 63/164* (2013.01); *H04W 36/14* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 6,154,461 | A | * 11/2000 | Sturniolo | H04W 36/18 370/338 |
| 6,263,369 | B1 | 7/2001 | Sitaraman et al. | |
| 7,042,988 | B2 | * 5/2006 | Juitt et al. | 379/88.17 |
| 7,693,507 | B2 | 4/2010 | Suzuki et al. | |
| 8,166,537 | B1 | * 4/2012 | Viswanath | H04L 63/102 713/153 |
| 8,861,488 | B2 | * 10/2014 | Vogety | H04W 8/12 370/329 |
| 2005/0021979 | A1 | 1/2005 | Wiedmann et al. | |
| 2005/0030945 | A1 | 2/2005 | Sarikaya et al. | |

(Continued)

*Primary Examiner* — Benjamin Lanier

(57) ABSTRACT

A secure communication channel between an access point (AP) device associated with a wireless network and a mobile gateway (GW) device of a packet core network is established. Data is exchanged between the wireless network and the packet core network through the secure channel. A client device (UE) is authenticated through the secure communication channel. Device identity information is received from the AP device. A session request is sent to the packet core network. An IP address for the device is received from the packet core network. The communication between the AP device and the packet core network becomes secure without need to run an IP secure protocol on the UE that saves the battery power on the UE. Establishing the fully secure communication between the UE and the packet core network while saving the UE power provides a significant advantage for the mobile technology world.

26 Claims, 9 Drawing Sheets

(56) References Cited

U.S. PATENT DOCUMENTS

| | | | |
|---|---|---|---|
| 2008/0076386 A1* | 3/2008 | Khetawat et al. | 455/410 |
| 2010/0080123 A1* | 4/2010 | Kahn | H04W 80/04 370/235 |
| 2011/0019641 A1* | 1/2011 | Chang | H04W 36/005 370/331 |
| 2011/0103303 A1* | 5/2011 | Hsu et al. | 370/328 |
| 2011/0131338 A1* | 6/2011 | Hu | H04W 76/02 709/229 |
| 2012/0051348 A1* | 3/2012 | Zhu et al. | 370/338 |
| 2013/0103833 A1* | 4/2013 | Ringland et al. | 709/224 |

* cited by examiner

METHODS AND APPARATUSES TO PROVIDE SECURE COMMUNICATION BETWEEN AN UNTRUSTED WIRELESS ACCESS NETWORK AND A TRUSTED CONTROLLED NETWORK

This application claims the benefit of U.S. Provisional Application No. 61/627,792, filed on Oct. 17, 2011, which is incorporated by reference herein in its entirety.

FIELD

At least some embodiments of the present invention generally relate to wireless networking, and more particularly, to coupling an untrusted wireless access network to a trusted controlled network.

BACKGROUND

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium. Generally, Wi-Fi refers to a mechanism for wirelessly connecting electronic devices. A device enabled with Wi-Fi, e.g., a personal computer, video game console, smartphone, or digital audio player, can connect to the Internet via a wireless network access point. Multiple overlapping access points may cover large areas.

Generally, a cellular (mobile) network refers to a radio network distributed over land areas called cells, each served by at least one fixed-location transceiver known as a cell site or base station. When joined together these cells can provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

SUMMARY

Exemplary embodiments of methods and apparatuses to couple an untrusted wireless access network to a trusted controlled network via a secure tunnel are described. In one embodiment, cellular-WiFi communication is provided via a secure IP tunnel. A secure communication channel between an access point (AP) device associated with a wireless network and a packet core network is established. Data are transmitted from the wireless network to the packet core network through the secure channel. A device is authenticated through the secure communication channel. When the device identity information is received from the AP device, a session request is sent to the packet core network based on the device identity information. The session response including an IP address for the device is received from the packet core wireless network.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1A:
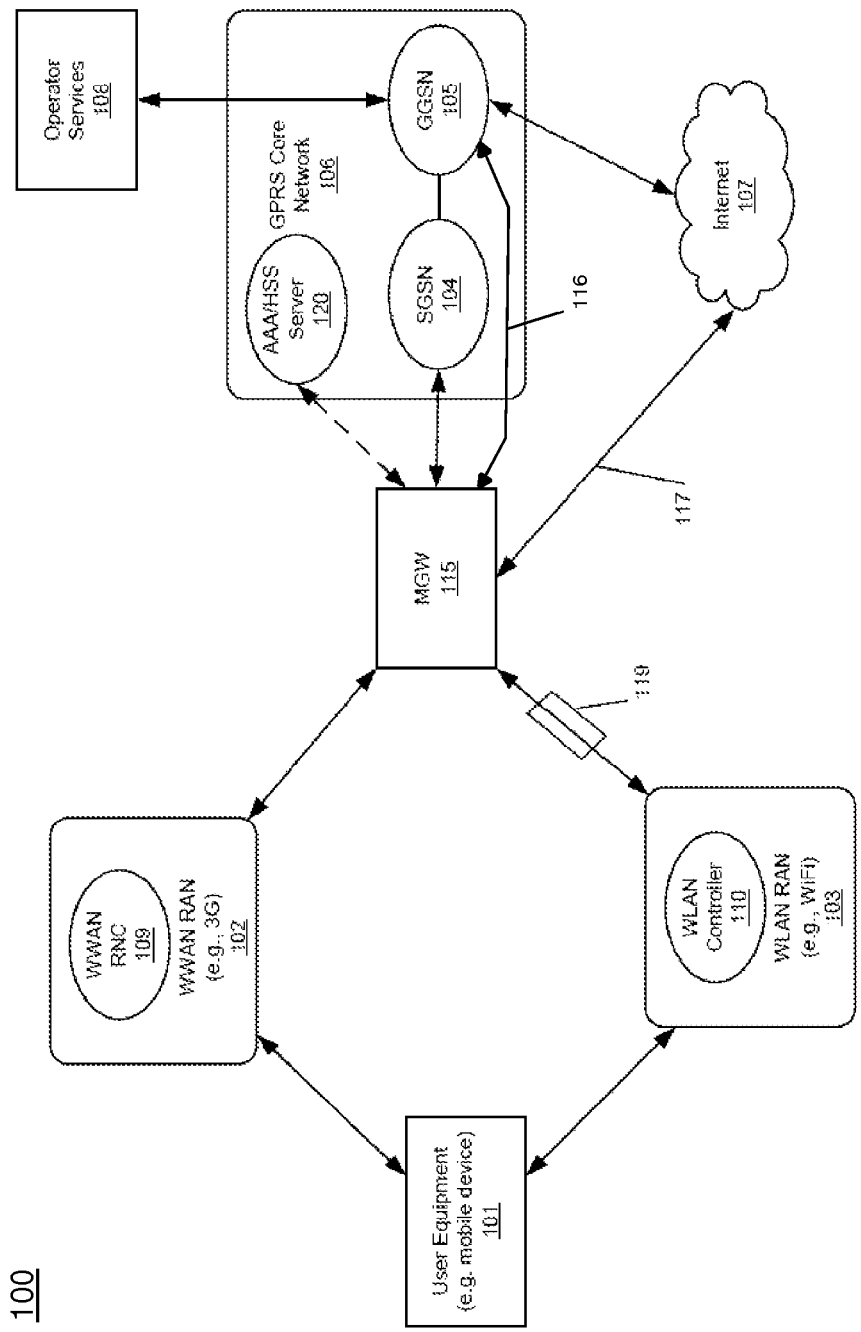
FIG. 1A is a block diagram illustrating an interworked WLAN and WWAN system according to at least one embodiment.

Exemplary embodiments of methods and apparatuses to couple an untrusted wireless access network to a trusted controlled network via a secure tunnel are described. In one embodiment, cellular-WiFi communication is provided via a secure Internet Protocol (IP) tunnel. Implementing cellular-WiFi communication via a secure tunnel between an access point (AP) device associated with the WiFi network and a cellular (packet core) network does not require Internet Protocol Security (IPSec)/Internet Key Exchange (IKE) on a user equipment (UE). In one embodiment, a secure IP tunnel is established between an access point (AP) device associated with a wireless access network and a gateway located at an edge of a mobile (packet core) network. In one embodiment, an IP address assigned to the UE is a private address provided from a mobile network address space, as described in further detail below.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention. Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g.; computer) readable storage medium, such as, but is not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below.

In addition, embodiments of the present invention are not described with reference to any particular programming language. It will be appreciated that a variety of programming languages may be used to implement the teachings of embodiments of the invention as described herein.

FIG. 1A is a block diagram illustrating an interworked wireless local area network (WLAN) and wireless wide area network (WWAN) system according to one embodiment. Referring to FIG. 1A, user equipment (UE) 101 is communicatively coupled to radio network controller (RNC) 109 of a radio access network (RAN) 102. In order to access other networks such as Internet 107 and/or operator services node 108, UE 101 goes through gateway device 115 and/or a third generation partnership project (3GPP) packet core network 106. Typically, 3GPP packet core network 106 includes a serving General Packet Radio Service (GPRS) support node (SGSN) 104 and a gateway GPRS support node (GGSN)/packet data network (PDN) gateway (P-GW) 105. These support node SGSN and gateway node GGSN/P-GW relay communications between a user terminal (or source mobile station) and a destination. Note that typically, there may be multiple SGSNs associated with a GGSN, multiple RNCs associated with a SGSN, and multiple UEs associated with an RNC in a hierarchical structure (not shown). Note that throughout this application, GGSN and P-GW are interchangeable terms dependent upon the specific network configuration. Typically, GGSN is referred to a packet core component in a 3G network while a P-GW is referred to a packet core component in a 4G network. Also note that a packet core component may have functionalities of a GGSN and/or P-GW.

SGSN 104 and GGSN/P-GW 105 include a function of relaying communications between a user terminal (or source mobile station) and a destination node (e.g. a server in the Internet or another mobile station). SGSN 104 effects data transmission between UE 101 and GGSN/P-GW 105. For example, SGSN 104 collects up-link sessions from RNC 102 and distributes the down-link session delivered from GGSN/P-GW 105 toward RNC 102. SGSN 104 manages a packet service between SGSN 104 and GGSN/P-GW 105 by tunneling (e.g., GPRS tunneling protocol or GTP). SGSN 104 receives a subscriber profile stored in a home location register (HLR) and has therein at any time a copy thereof. The subscriber profile has information about the subscribed services (Internet, operator walled garden etc.)

GGSN/P-GW 105 functions as a logical interface to an external data packet network such as Internet 107 and/or operator services node 108. GGSN/P-GW 105 operates for coupling between core network 106 and such external packet data networks 107 and 108. More specifically, GGSN/P-GW 105 collects up-link sessions from SGSN 104 and accesses Internet 107 and/or operator services 108. GGSN/P-GW 105 in the 3GPP packet core network 106 sets up a tunnel down to SGSN 104 for down-link sessions.

UE 101 may be any of a variety of mobile devices, such as a Smartphone, tablet, a laptop, a gaming device, and/or a media device, etc., having the capability of communicating with a mobility gateway device (MGW) 115 (e.g., a SSX device from Stoke Inc., of Santa Clara, Calif.) via a variety of RANs. In at least some embodiments, MGW 115 includes a mobile data offloading/packet data gateway/tunnel terminal gateway. In one embodiment, UE 101 can also access MGW 115 via WLAN controller 110 (e.g., an access point) of WLAN RAN 103. As shown in FIG. 1A, a secure tunnel (IPsec) 119 is established between the WLAN controller 110 and MGW 115, as described in further detail below. As shown in FIG. 1A, a WLAN RAN 103 is coupled to a broadband provider (e.g., a broadband remote access server or BRAS). UE 101 can roam between RAN 102 and RAN 103 while maintaining the same communications session (e.g., mobility) with a remote entity such as operator service node 108 or Internet 107, in which the mobility is managed by MGW 115. MGW 115 includes capability of offload Internet-bound traffic to Internet 107 without going through at least SGSN 104 of core network 106. MGW 115 is also referred to herein as a mobile data offload gateway (MDO-GW) device for offloading traffic to Internet 107 without having to go through WWAN core network 106.

In one embodiment, MGW 115 is configured to interpret the control traffic flowing between UE/RNC and SGSN. Particularly, MGW 115 is configured to examine the control traffic to determine whether UE 101 is attempting to establish a communication path with the Internet 107 or operator services 108. If the traffic is for operator's services 108, both the control traffic and the associated data traffic are allowed to reach, via SGSN 104 for transfer to GGSN/P-GW 105 in order to reach operator's services 108. In at least some embodiments, MGW 115 directly communicates the control traffic and the associated data traffic to GGSN/P-GW 105 via a path 116 (e.g., a GTP tunnel). In this scenario, the IP address (by which UE 101 is represented to the operator's services 108) is allocated by GGSN/P-GW 105 and IP routers are configured to route all traffic destined to this IP address to GGSN/P-GW 105 which in turn tunnels the data to UE 101. Thus, MGW 115 does not interfere with the control traffic that is exchanged between UE 101 and the 3GPP packet core network 106 for registering UE 101 with the network 106, as well as the mutual authentication between UE 101 and network 106. If it is determined that the specific traffic flow is to be offloaded, MGW 115 directs that traffic to Internet 107 via path 117, bypassing SGSN 104 and/or GGSN/P-GW 105 of 3GPP packet core network 106. Thus, only the selected traffic is diverted directly to the Internet 107, while the rest of the traffic will be allowed to enter 3GPP packet core network 106.

Note that throughout this description, a 3G RAN and an RNC are used as an example of an access network and a gateway device. However, the present invention is not limited to use in network with these components. Other configurations may also be applied. For example, RAN 103 may be a femto cell while WLAN controller 110 may be a femto gateway device. Further detailed information concerning the offloading techniques of MGW 115 can be found in co-pending U.S. patent application Ser. No. 12/425,853, entitled "Method and System for Bypassing 3GPP Packet Switched Core Network when Accessing Internet from 3GPP UEs using 3GPP Radio Access Network," filed Mar. 31, 2009, which is incorporated by reference herein in its entirety.

Referring back to FIG. 1A, for the purpose of illustration, according to one embodiment, Wi-Fi equipped UE 101 detects Wi-Fi access network and initiates 802.1x based authentication with WiFi controller 110. UE 101 can use any extensible authentication protocol (EAP) based authentication, such as EAP-subscriber identity module (EAP-SIM) and/or EAP-AKA protocols. A network access identifier (NAI) used in the IEEE 802.1x exchange contains the information identifying a mobile network operator (MNO) that informs an access point (AP) or WiFi controller 110 to initiate an EAP or a remote authentication dial-in user service (RADIUS) authentication session towards MGW 115. The EAP-AKA/EAP-SIM exchange may be completed against a 3GPP authentication, authorization, and accounting (AAA) server or home subscriber server (HSS) 120. If the MNO network does not have a 3GPP AAA server, MGW 115 can fulfill this role and interact with the associated HSS directly. Upon successful authentication, MGW 115 is configured to convey encryption keys securely to WiFi controller 110. In at least some embodiments, IPsec tunnel 119 between the WLAN controller 110 and MGW 115 is a static channel established before the authentication stage. In at least some embodiments, IPsec 119 is a dynamic channel established, for example, via a discovery mechanism, as set forth in further detail below. As will be described in details further below, this lays the foundation for seamless mobility across a WLAN to a WWAN. In addition, it allows an operator to run analytics on all user traffic. The seamless mobility is an important feature of cellular networks. The seamless mobility refers to the ability to have continued service as the user moves that makes the mobile service appealing. The mobility may include wide area roaming and session handover. Both play important role in achieving the desired user experience. Wide area roaming means the ability to automatically discovers and secure access rights through a point of attachment to a network over the coverage area. For a data session, handover means changing the point of attachment while maintaining the same IP address and with minimal packet loss. In one embodiment, MGW 115 is configured to buffer packets received from UE 101 or from the network (e.g., Internet or core network) while the handover is being processed. Once the handover has been completed, MGW 115 is configured resume routing of the packets using the proper IP address. In mobile devices where power is at a premium, resetting connections or IP stack is undesirable since one ends up consuming more power for the same task.

According to one embodiment, UE 101 moves in WiFi coverage area 103 and starts an association and session establishment procedure with WiFi controller 110. During the WiFi session setup, MGW 115 can assign an IP address to WiFi capable UE 101. In one embodiment, MGW 115 communicates an IP address to the WLAN controller that was assigned to the user equipment during the active session of the WWAN, where this WWAN assigned IP address is used by WLAN controller 110 to identify the traffic to/from the UE 101 while WLAN controller 110 is communicatively coupled to the WLAN and tunnels that UE traffic between MGW 115 and WLAN controller 110.

For example, MGW 115 can assign an IP address allocated from its IP address pool if the session is to be offloaded to Internet 107 bypassing core network 106. Alternatively, MGW 115 can assign an IP address allocated by GGSN/P-GW 105 if the session is to access core network 106. In order to provide seamless mobility, MGW 115 examines whether there is already a macro session, e.g., 3G session via 3G RAN 102 ongoing for the same user. If so, it assigns the same IP address and switches the data traffic to established IPsec tunnel ("channel") towards WiFi controller 110. In one embodiment, WiFi controller 110 then maps this GTP session to an 802.11 session (e.g., WiFi session) towards UE 101. Specifically, for packets coming from the network side (e.g., core network 106 or Internet 107), WiFi controller 110 decapsulates the packet and then encrypts the inner packet as per WiFi protocol (e.g., 802.11i protocol) and sends it towards UE 101. For the packets coming from UE 101, WiFi controller 110 is configured to decrypt the packet and then to send the packet via the IPsec tunnel towards MGW 115. MGW 115 has the ability to interface with external packet data networks including Internet 107. MGW 115 also serves as the anchor when UE 101 moves across Wi-Fi RAN 103 (also referred to as a micro network) and macro RAN 102.

According to another embodiment, when UE 101 moves out of Wi-Fi coverage 103 into 3G macro RAN 102, UE 101 may initiate an attach and session activation with core network 106. Since MGW 115 is located between RAN 102 and the core network 106, MGW 115 sees the signaling and detects that the incoming PDP activation is for a UE that is already active on Wi-Fi network 103, for example, based on the unique identifier (e.g., an international mobile subscriber identifier IMSI) of the UE. This scenario applies to UE 101 waking up from an idle mode as well. By correlating these two paths towards UE 101, MGW 115 assigns the same IP address that has been assigned to the WiFi network session to the incoming 3G session. MGW 115 then switches onto the GTP data path towards the RNC 102. Since in most cases the macro network provides the wider umbrella coverage, in one embodiment, the packet data protocol (PDP) context may be preserved at UE 101 so that UE 101 does not go through unnecessary session set and tear down; rather UE 101 can use idle mode signaling. MGW 115 is also capable of correlating an idle session, which is useful for battery life preservation on the handset.

Figure 2:
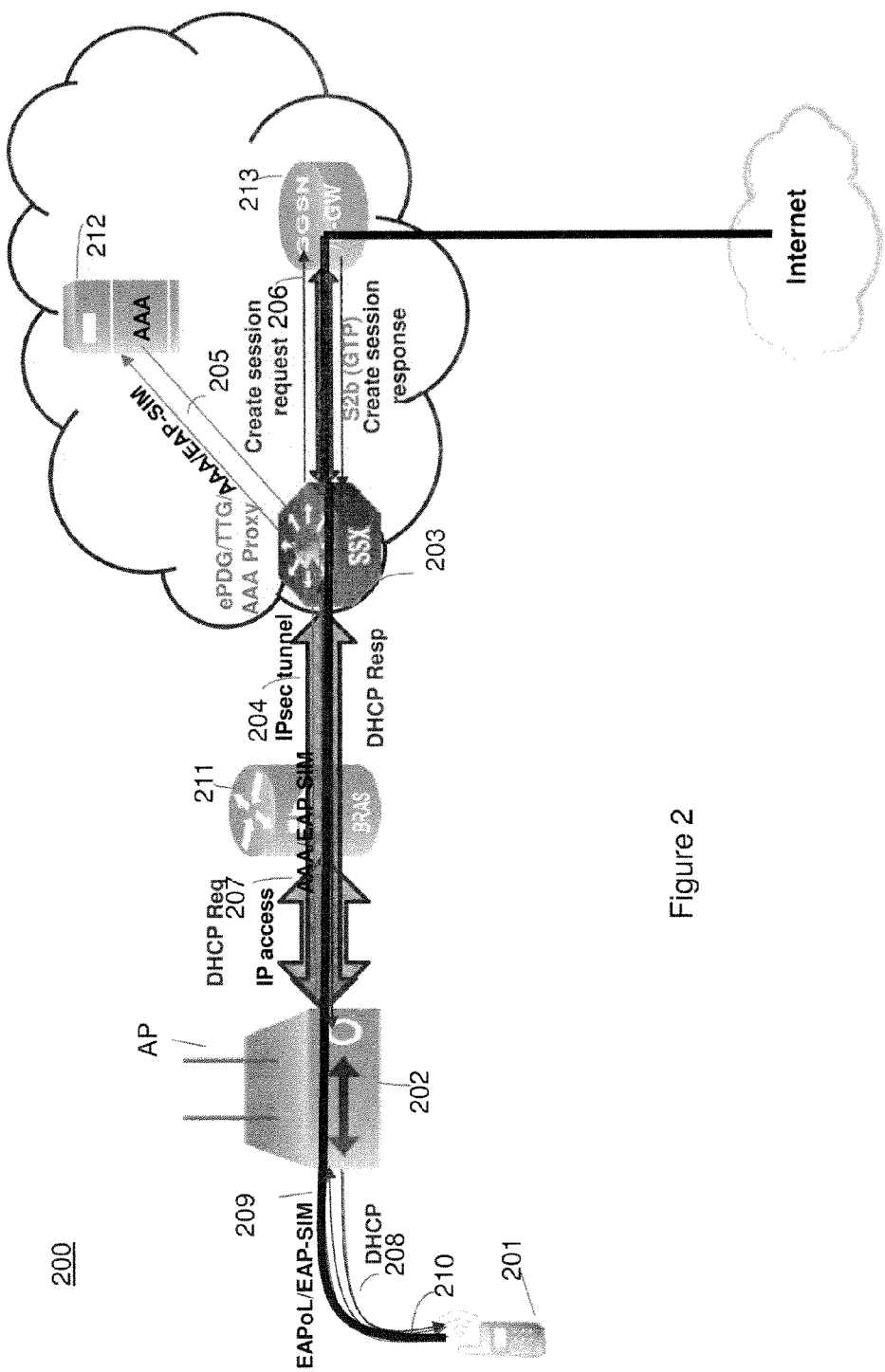
FIG. 2 shows a diagram to provide a cellular-WiFi communication according to one embodiment of the invention.

FIG. 2 shows a diagram 200 of a system to provide cellular-WiFi communication according to one embodiment of the invention. As shown in FIG. 2, a UE wireless device 201 (e.g., a mobile phone) is communicably coupled 209 to an access point 202 in a wireless network (e.g., a WiFi network). In one embodiment, the wireless network including access point 202 and the device 201 is not trusted by a mobile (e.g., cellular) network (e.g., a Packet Core network). In one embodiment, the wireless network is a WiFi network.

As shown in FIG. 2, access point 202 is communicably coupled to a mobility gateway 203 via an IP secure tunnel 204. In one embodiment, the mobility gateway 203 is located at an edge of a mobile network and is communicably coupled to a mobile network gateway 213 via a mobile network tunnel 206. The gateway 203 is also communicably coupled to an AAA server 212. The mobile network gateway (e.g., GGSN/P-GW) 213 is communicably coupled to the Internet. In one embodiment, a WiFi access network is controlled by the mobile (cellular) operator network (e.g., Packet Core Network) as a part of the mobile operator trusted network via a secure tunnel. That is, an operator of a mobile network can communicably couple a untrusted WiFi access network to the operator's own trusted controlled radio network. In one embodiment, a cellular (mobile operator) network has its own IP address space. An IP address from the cellular network space is assigned to a UE device 201 (e.g., a mobile phone).

The device 201 and an access point (AP) 202 in the wireless network (e.g., wireless LAN or WLAN) are connected through a layer two connection (e.g., layer-two switching). As shown in FIG. 2, network traffic is forced through an IP secure tunnel ("IPsec") 204 established between the access point (AP) 202 and a gateway (MGW) 203 (e.g., a SSX device from Stoke Inc., of Santa Clara, Calif.).

Internet Protocol Security (IPsec) refers to a protocol suite for securing Internet Protocol (IP) communications by authenticating and encrypting each IP packet of a communication session. In at least some embodiments, IPsec also includes protocols for establishing mutual authentication between agents (e.g., AP 202 and gateway 203) at the beginning of the session and negotiation of cryptographic keys to be used during the session. Generally, IPsec can be an end-to-end security scheme operating in the Internet Layer of the Internet Protocol Suite. It can be used in protecting data flows between a pair of hosts (host-to-host), between a pair of security gateways (network-to-network), or between a security gateway and a host (network-to-host). Generally, Internet Key Exchange (IKE or IKEv2) is a protocol used to set up a security association (SA) in the IPsec protocol suite.

As shown in FIG. 2, gateway 203 provides an IP address to the device 201 via a IP secure tunnel 204. A device communicatively coupled to a WiFi network and a cellular network, gets continuous connectivity. In at least some embodiments, the IP address of the device communicatively coupled to a WiFi network and a cellular network is maintained the same. In one embodiment, an IP secure tunnel 204 into which network traffic between one or more devices, such as a device 201 and a gateway 203 (e.g., a SSX device) is forced is a static channel. In another embodiment, an IP secure tunnel into which network traffic between one or more devices and a gateway (e.g., a SSX device) is forced is established dynamically e.g., via a discovery mechanism.

In one embodiment, an access point (AP) 202 in a wireless network obtains an Internet Protocol (IP) access from a provider 211. The access point 202, for example, can be connected to the Internet via a Digital Subscriber Line (DSL) to an Internet Service Provider (ISP) gateway. A user equipment device 201 can be for example, a mobile phone, or any other wireless device. In one embodiment, a WiFi access point (AP) 202 obtains an Internet Protocol (IP) access 207 from a broadband provider (e.g., BRAS). In another embodiment, the AP obtains an IP access from a broadband network.

Next, an IP secure tunnel, such as an IP secure tunnel 204 between the AP (e.g., AP 202) and a gateway (e.g., gateway 203) is established. The IP secure tunnel depending on the network can be static or dynamic. In one embodiment, a static IPsec tunnel is established between the AP and Enhanced Packet Data Gateway (e.g., an ePDG SSX) for an untrusted network between the AP (e.g., 202) and the gateway (e.g., 203). In another embodiment, a layer Virtual Private Network (VPN) or Virtual Private LAN Service (VPLS) is dynamically used to force traffic towards the gateway (e.g., a SSX) without requiring an IPSec tunnel.

Figure 3:
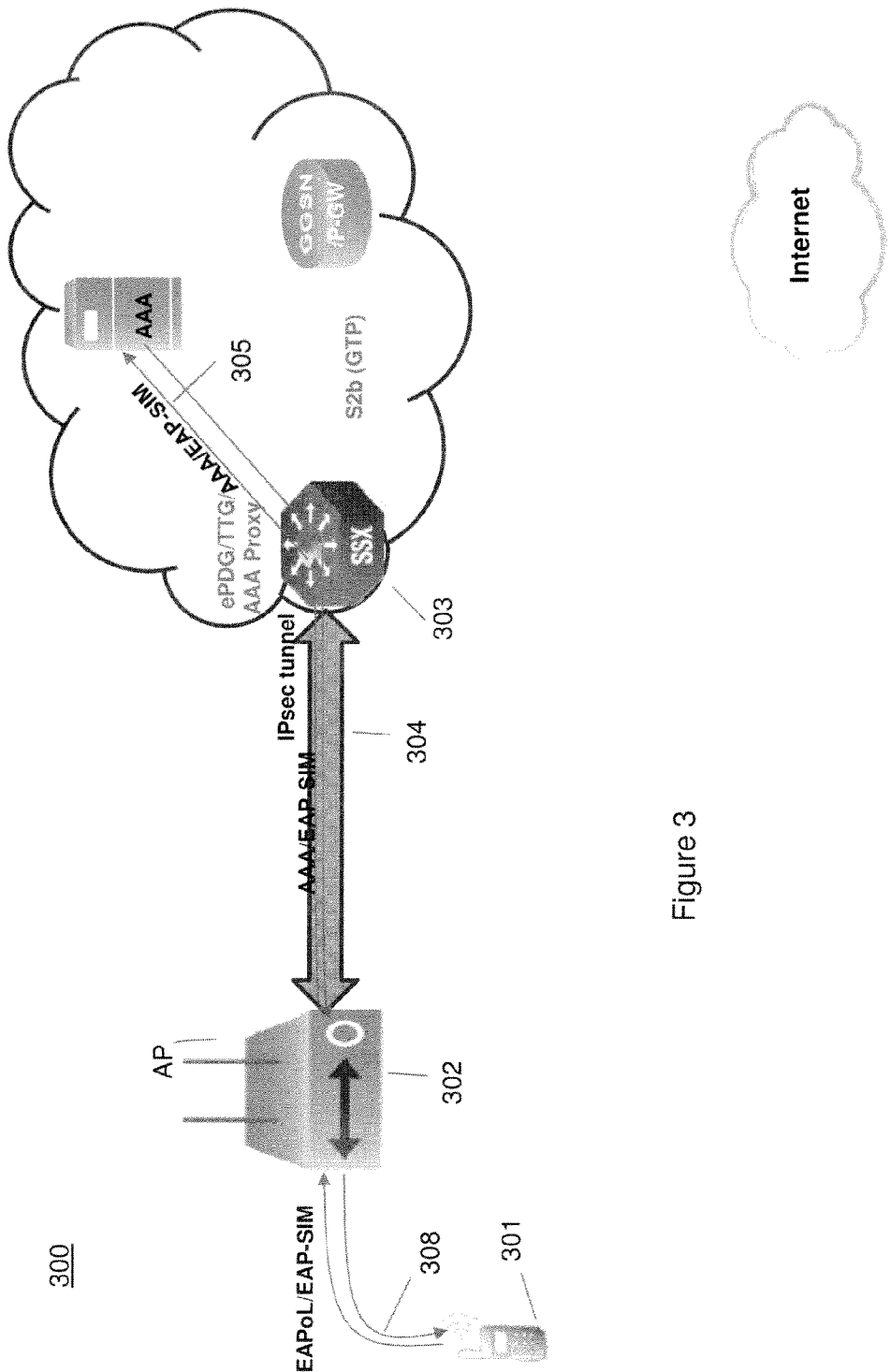
FIG. 3 shows a diagram to provide an authentication between networks, according to one embodiment of the invention.

FIG. 3 shows a diagram 300 to provide authentication between two networks, such as WiFi network and a cellular network, according to one embodiment. As shown in FIGS. 2 and 3, a UE device (e.g., one of UE device 201 and a UE device 301) is authenticated (e.g., 210, 308) by an AP (e.g., one of AP 202 and AP 302). In one embodiment, after the device is associated with the AP and receives a service set identifier (SSID), the AP initiates an authentication protocol (e.g., EAPoL/EAP-SIM (802.1x)) to authenticate the device. Generally, Extensible Authentication Protocol Method for GSM Subscriber Identity Module (EAP-SIM) is an Extensible Authentication Protocol (EAP) mechanism for authentication and session key distribution using the Subscriber Identity Module (SIM) from the Global System for Mobile Communications (GSM). In one embodiment, the device is authenticated (205, 305) for an WLAN access by a service provider authentication, authorization and accounting protocol (AAA) server, such as a server 212, as shown in FIGS. 2 and 3.

As shown in FIGS. 2 and 3, identity information is transported to a MGW gateway (e.g., one of gateway 203 and gateway 303). In one embodiment, the MGW gateway acts as an AAA proxy. In one embodiment, when the static IPsec tunnel between the AP and the gateway (e.g., MGW) is established, the AP forces one or more authentication messages including the identity information into the static IPsec tunnel such as tunnels 204 and 304 by default. In another embodiment, when the IP security tunnel is established dynamically, the AP is configured to perform a discovery of an AAA proxy. In this case, the AP transports one or more messages including the identity information to the gateway acting as the AAA proxy as part of the discovery mechanism. In one embodiment, the AP uses any AAA protocol (e.g., RADIUS/DIAMETER protocol) to transport an Extensible Authentication Protocol Subscriber Identity Module (EAP-SIM) information 305 to the AAA Proxy.

In one embodiment, the gateway (e.g., SSX) behaves as an AAA proxy and proxies the AAA/EAP-SIM information (e.g., one of 205 and 305) to an AAA server, as shown in FIGS. 2 and 3. The gateway (e.g., SSX) also keeps some information about the user, for example, Mobile Subscriber number—IMSI (International Mobile Subscriber Identify), MAC address of the Wi-Fi radio on User Equipment, Service authorization data, and other user related information.

Next, an AAA response is transported back to the AP. In one embodiment, the gateway acting as an AAA proxy (e.g., one of 203, 303, 403, and 503) transports the AAA response back to the AP via the secure IP tunnel, such as tunnels 204 and 304.

Figure 6:
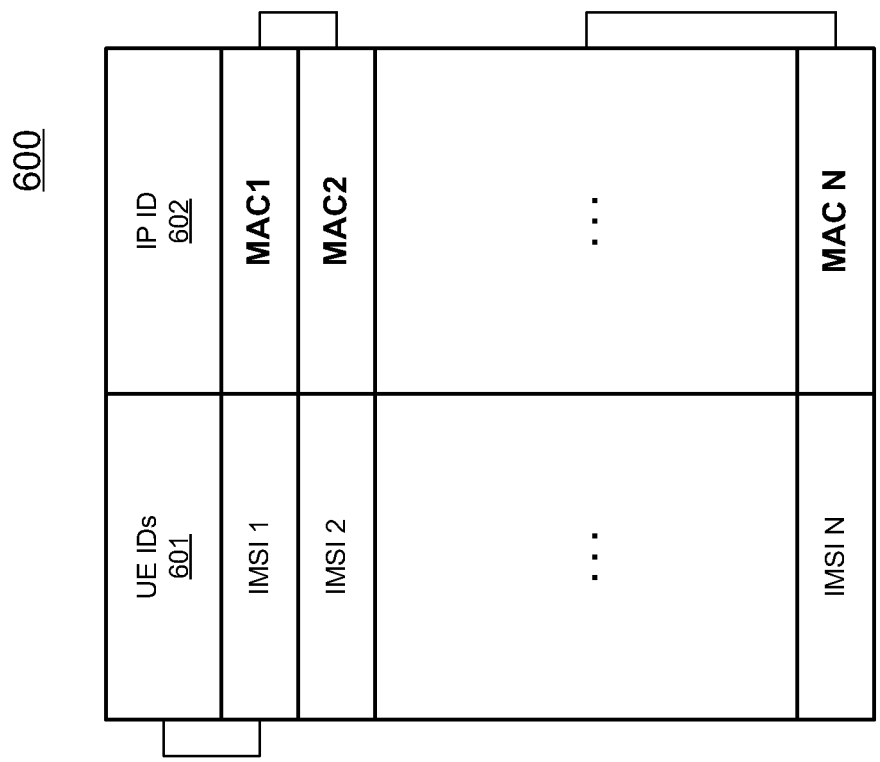
FIG. 6 illustrates a data structure representing a mapping table according to one embodiment.

In one embodiment, mapping between a user identity and a gateway network identity is generated and stored in a memory at a gateway acting as an AAA proxy. In one embodiment, a Media Access Control (MAC) address of an user equipment, a MAC address of an access point, and an IP address of the access point are mapped against the identity of a mobile subscriber (e.g., IMSI). In one embodiment, the mapping between the IP access level identifiers and the mobile subscriber identifiers is generated and stored at a gateway acting as an AAA proxy in a mapping data structure 600 similar to one as shown in FIG. 6.

At this point, the UE (e.g., 201 and 301) has been successfully authenticated by the service providers AAA server, and the context is cleared for the device. Next, provisioning of an IP address is performed, as shown in FIGS. 2 and 4.

Figure 4:
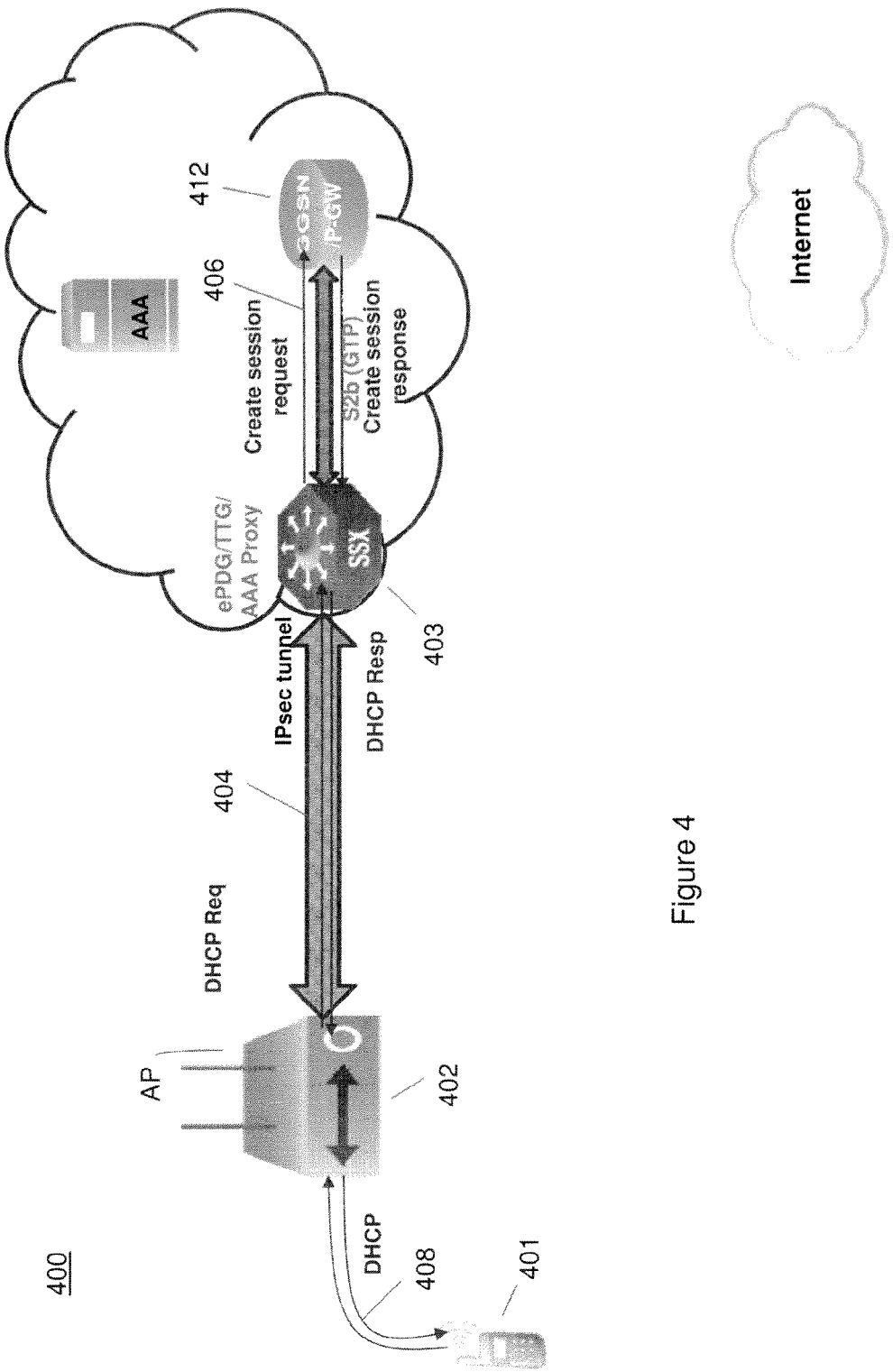
FIG. 4 shows a diagram to perform provisioning of an IP address according to one embodiment of the invention.

FIG. 4 shows a diagram 400 of a system to perform provisioning of an IP address between networks such as a WiFi network and a cellular network according to one embodiment of the invention. In one embodiment, the UE device (e.g., one of UE device 201 and UE device 401) starts a Dynamic Host Configuration Protocol (DHCP) (e.g., 208, 408) to get an IP address provisioned, and the gateway (e.g., one of gateway 203 and gateway 403) behaves as a DHCP server, as shown in FIGS. 2 and 4. As shown in FIGS. 2 and 4, the access point (e.g., one of AP 202 and AP 402) relays the DHCP request to the gateway via a IP secure tunnel (e.g, one of tunnel 204, and tunnel 404).

In one embodiment, the access point behaves as a DHCP relay agent and adds identity information of the UE into the DHCP request to send, via the IP secure tunnel, to the gateway. In one embodiment, the AP/Controller identifies the client using IMSI and/or MAC and/or Pseudo-IMSI to hide the subscriber identify field to send the UE identity to the gateway. For example, the AP/Controller can use option 61, or option 82 sub-option 6, or any other option to incorporate the UE identity to send to the gateway. In one embodiment, the AP adds a mobile subscriber identity into the DHCP request. The mobile subscriber identity can be, for example, an International Mobile Subscriber Identity (IMSI) it has from the EAP-SIM authentication to the gateway (e.g., SSX). As shown in FIG. 6, mobile subscriber identity (e.g., IMSI) can be stored in a field 601 of the data structure 600. Generally, IMSI is a unique identification associated with mobile network phone users. It is typically stored as a 64 bit field inside a device, e.g., a phone, and is sent by the device to a network. In another embodiment, the access point adds an IP level access identity into the DHCP request (e.g., a MAC address) to send through the IP secure tunnel. As shown in FIG. 6, IP level access identity (e.g., MAC address) can be stored in a field 602 of the data structure 600.

In one embodiment, a session towards a mobile operator network gateway (e.g., GGSN/PGW) is created based on the UE identity. As shown in FIGS. 2 and 4, upon receiving the DHCP request, the gateway, (e.g., one of gateway 203 and gateway 403) initiates a S2b (GTP) create session request towards GGSN/PGW to get the IP address. In one embodiment, the gateway (e.g., a SSX) uses a user identifier (e.g., IMSI, MAC address) and other provisioned fields to create a S2b (GTP) session towards a mobile network gateway (e.g., P-GW/GGSN). The mobile network can be 3G, 4G, or any other mobile network. A P-GW/GGSN is a Packet Data Network (PDN) Gateway used in LTE/4G networks. The Gateway General packet radio service (GPRS) Support Node (GGSN) is a component of the GPRS network. The GGSN can be responsible for the communication between the GPRS network and external packet switched networks, like the Internet and X.25 networks.

In one embodiment, a mobile network tunnel, such as tunnels 206 and 406, is set up between a gateway (e.g., MGM, SSX) acting as a AAA proxy (e.g., one of gateway 203, and gateway 403) and a mobile network gateway, such as gateway 213 and gateway 412 (e.g., P-GW/GGSN). In one embodiment, a mobile network (e.g., a GTP-U) tunnel is set up between a gateway acting as ePDG/Tunneling Terminating Gateway (TTG) proxy, such as gateway 203 and gateway 403 and a mobile network gateway, such as gateway 213 and 412 (e.g., P-GW/GGSN).

In one embodiment, the gateway (e.g., 203 and 403) receives a create session response from the mobile network gateway (e.g., P-GW/GGSN) including an IP address via the mobile network (e.g., GTP-U) tunnel, as shown in FIGS. 2 and 4. In one embodiment, a gateway (e.g., SSX) acting as an ePDG/TTG/AAA proxy forces the P-GW/GGSN assigned IP address in the DHCP response through the IP secure tunnel to the AP to relay to the UE device, as shown in FIGS. 2 and 4. A general packet radio service Tunneling Protocol GPRS GTP is a group of IP-based communications protocols used to carry General Packet Radio Service (GPRS) within GSM, UMTS and LTE networks. Typically, a GTP-U is used for carrying user data within the GPRS Core Network and between the Radio Access Network and the core network. The UE device (e.g., one of 201 and 401) receives the mobile network assigned IP address relayed via the AP by the gateway (e.g., SSX) via a secure IP channel, as shown in FIGS. 2 and 4.

Figure 5:
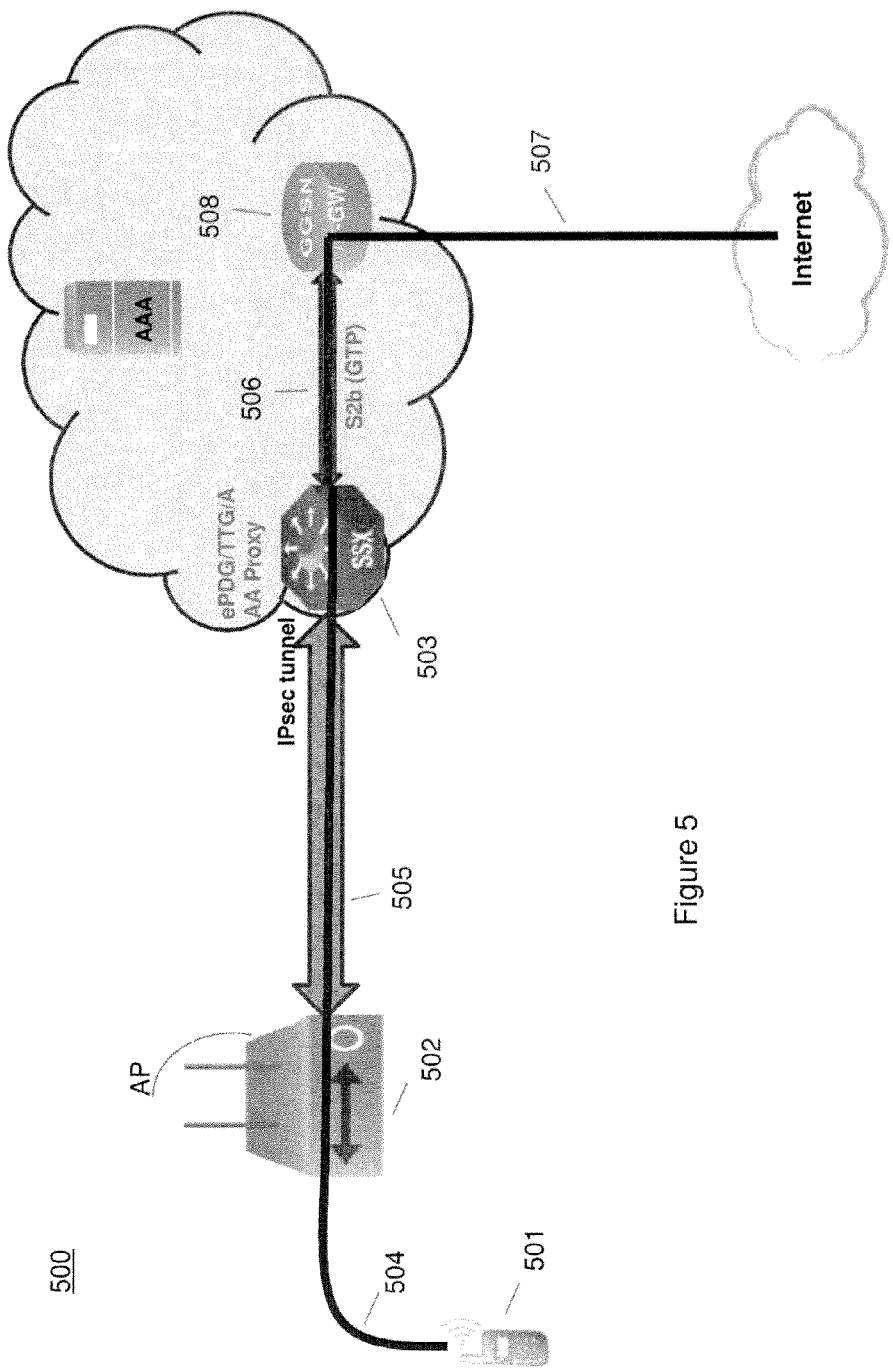
FIG. 5 shows a diagram to communicate data packets between two networks according to one embodiment of the invention.

FIG. 5 shows a diagram 500 of a system to communicate data packets between two networks such as a WiFi network and a cellular network according to one embodiment of the invention. In one embodiment, the UE device, such as a UE device 201 and UE device 501, uses the mobile network (e.g., P-GW/GGSN) assigned IP address as a source for its data packets. In one embodiment, the AP/Controller (e.g., AP 202 and AP 502) forwards the data packets towards the gateway (e.g., gateway 203 and gateway 503) (e.g., SSX) acting as a ePDG/TTG proxy through the IPsec tunnel, such as tunnel 204 and tunnel 505, as shown in FIGS. 2 and 5 respectively. In one embodiment, the gateway, such as gateway 203 and gateway 503 (e.g., SSX) acting as an ePDG/TTG proxy forwards the data packets through a mobile network channel (e.g., GTP-U) (e.g., channel 206 and channel 506) towards a mobile network gateway (e.g., gateway 213 and gateway 508) (e.g., P-GW/GGSN), as shown in FIGS. 2 and 5. In one embodiment, the mobile network gateway (e.g., gateway 213 and gateway 508) (e.g., P-GW/GGSN) forwards the data packets (e.g., 507) towards a service provider network (e.g. Internet), as shown in FIGS. 2 and 5.

In one embodiment, a local IP is assigned to a device (e.g., UE) by the AP while a Domain Name System (DNS) can be used for a SSX discovery for both AAA Proxy role and PDG/ePDG role. The DNS typically associates various information with domain names assigned to each of the participating devices in a network. For example, DNS translates domain names meaningful to humans into the numerical identifiers associated with networking equipment devices for the purpose of locating and addressing these devices.

In one embodiment, a gateway (e.g., SSX) acting as a n DHCP server can provide just one IP address and maintains mapping of different public data network (PDN) assigned IP addresses to the IP address assigned by DHCP options (multiple Tunnels from SSX to various PDN-GWs). As set forth above, the communication between an access point (AP) device and a packet core network becomes secure without need to run an IP secure protocol on a client device (UE). This can save the battery power on the UE. Establishing the fully secure communication between the UE and the packet core network while saving the UE power provides a significant advantage for the mobile technology world.

Figure 8:
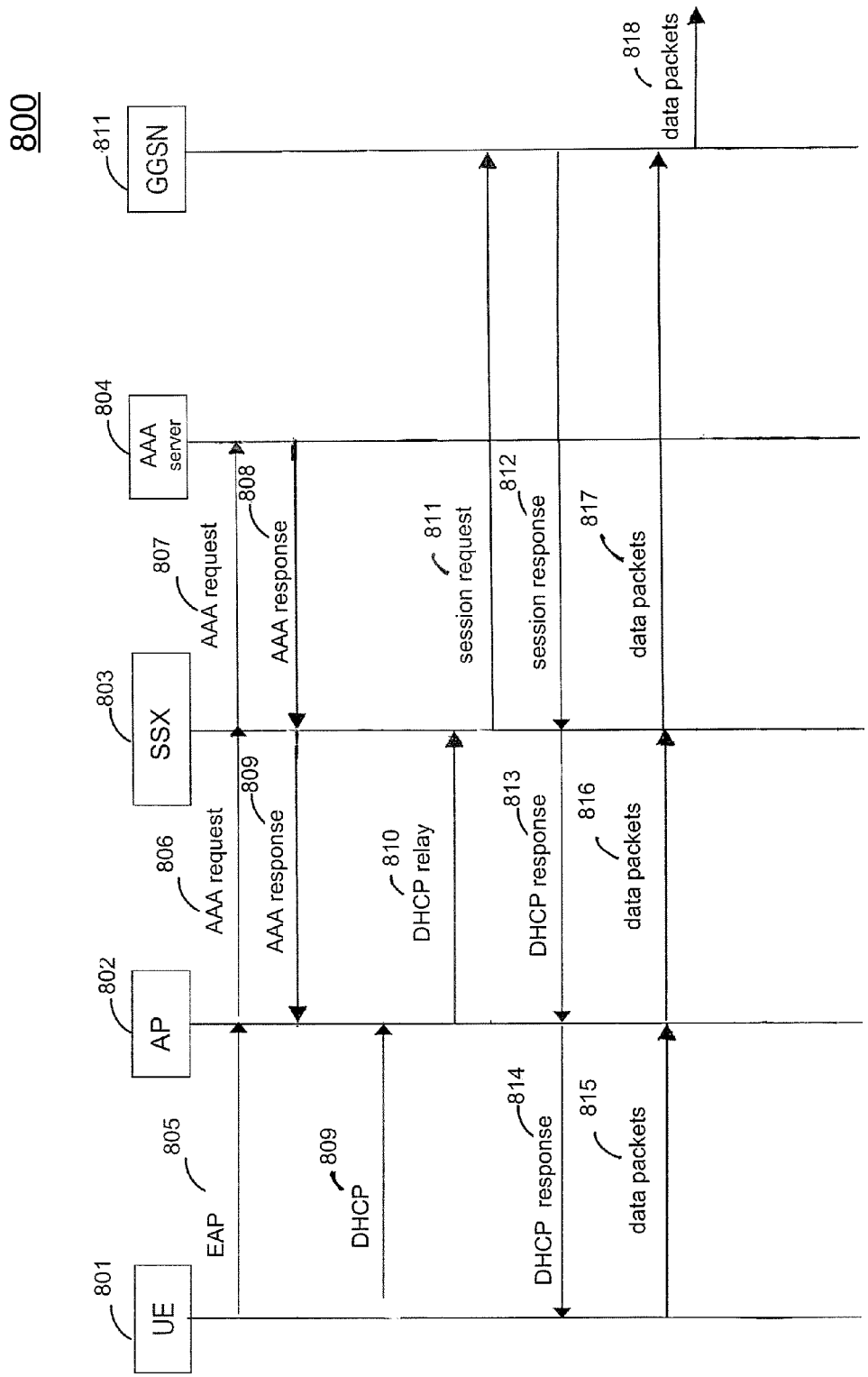
FIG. 8 is a transaction diagram illustrating a method to provide a secure communication between an untrusted wireless access network and a trusted controlled network according to one embodiment.

FIG. 8 is a transaction diagram 800 illustrating a method to provide a secure communication between an untrusted wireless access network and a trusted controlled network according to one embodiment. In one embodiment, a WiFi access point 802 gets an IP access from a broadband provider (e.g., BRAS), as described above. A static IPsec tunnel is established between the AP 802 and a SSX device 803 (ePDG SSX) for untrusted network between AP 802 and device 803, as described above. Alternatively, a layer VPN or VPLS can be used to force traffic towards the SSX without requiring IPSec tunnel, as described above. After a UE 801 attaches to the SSID, it initiates an EAP request 805 EAPoL/EAP-SIM (802.1x) for authentication. AP 802 uses any AAA protocol (RADIUS/DIAMETER) to transport the AAA request 806 (e.g., EAP-SIM) to the gateway 803 that behaves as a AAA Proxy. Next, SSX device 803 proxies the AAA request 807 (e.g., AAA/EAP-SIM) to AAA server 804. Also the SSX device 803 keeps some information about the user. After receiving AAA response from AAA server 804, SSX device 803 transports the AAA response 809 back to the AP 802. At this point UE has been successfully authenticated by the service providers AAA server 804.

Next, UE 801 starts DHCP 809 to get IP address provisioned. AP/Controller 802 behaves as a DHCP relay agent to relay the UE identity (e.g., IMSI) 810 it has from the EAP-SIM authentication to SSX device 803. AP/Controller 802 can use, for example, option 61, option 82 sub-option 6, or any option in which the UE identity can be incorporated. SSX device 803 uses the client identifier provided in the option 61 field and other provisioned fields required to create a session 811 towards a P-GW/GGSN 811. A session response 812 is transmitted from GGSN 811. A GTP-U tunnel is setup between SSX device (ePDG/TTG) 803 and P-GW/GGSN 811. SSX device 803 sends the P-GW/GGSN 811 assigned address in the DHCP response 813 to AP 802 that relays the DHCP response 814 to UE 801. UE 801 uses the P-GW/GGSN assigned IP address as the source for its data packets 815. AP/Controller 802 forwards these data packets 816 through the IPsec tunnel towards the SSX device 803 (ePDG/TTG). SSX device 803 (ePDG/TTG) forwards these data packets 817 through the GTP-U towards P-GW/GGSN 811. P-GW/GGSN 811 forwards these packets 818 towards the service provider network.

Figure 7:
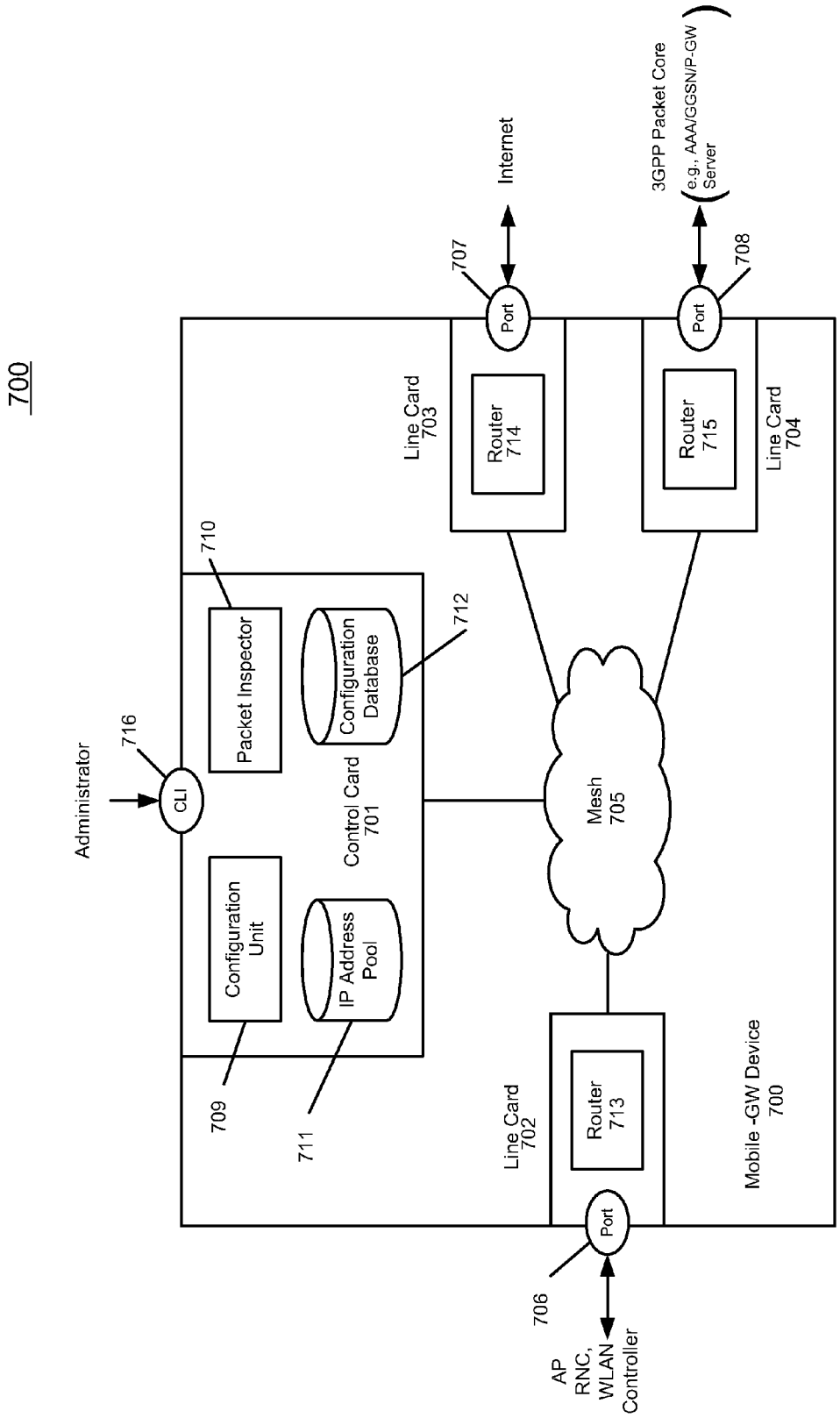
FIG. 7 is a block diagram illustrating a mobility gateway device according to one embodiment.

FIG. 7 is a block diagram 700 illustrating a mobility gateway device according to one embodiment of the invention. For example, MGW 700 may be implemented as a part of MGW 115 of FIG. 1. Referring to FIG. 7, MGW 700 includes, but is not limited to, a control card 701 (also referred to as a control plane) communicatively coupled to one or more line cards 702-704 (also referred to as interface cards or user planes) over a mesh 705, which may be a mesh network, an interconnect, a bus, or a combination thereof. Each of the line cards 703-704 is associated with one or more interfaces (also referred to as ports), such as interfaces 706-708 respectively. Each line card includes routing functional block (e.g., blocks 713-715) to route packets via the corresponding interface according to a configuration (e.g., routing table) configured by control card 701. For the purpose of illustration, it is assumed that interface 706 is to be coupled to an access point as in FIGS. 2-5, an RNC of a RAN or a WLAN controller of a WLAN as set forth in FIG. 1A; interface 707 is to be coupled to the Internet as in FIGS. 1-5; and interface 708 is to be coupled to a 3GPP packet core network (e.g., an AAA server/GGSN/P-GW), as in FIGS. 2-3.

According to one embodiment, control card 701 includes a configuration unit 709, a packet inspector 710, an IP address pool database 711, and a configuration database 712. In one embodiment, database 712 is used to store information regarding which access point names (APNs) of which the traffic should be diverted to the Internet directly bypassing the 3GPP packet core network. In addition, database 712 may also be utilized to store the mapping table for the IP addresses such as data structure 600 of FIG. 6. At least a portion of information stored in database 712 may be pushed down to line cards 702-704, for example, as part of a routing table (not shown). As described above, an administrator can configure or specify via a User Interface (e.g. command line interface (CLI)) 716 which APNs for the purpose of Internet breakout. Through User Interface 716, the administrator can also enable and/or disable a specific APN for Internet breakout purposes (e.g., by removing or adding APNs)

In one embodiment, packet inspector 710 is configured to inspect session initiation request control packets to establish a connection to determine whether the traffic is to be Internet bound by comparing the APN values provided in the request and the APNs stored/configured in database 712. Based on the configuration set up by control card 701, a packet router functional block of each line card is configured to route the corresponding data packets to the Internet directly, for example, via interface 707, bypassing the 3GPP packet core network. Otherwise, if configuration unit 709 determines that a packet is destined for the 3GPP packet core network, the packet router would route the packet to the 3GPP packet core network, for example, via interface 708.

Note that some of the functionality of control card 701 may be delegated or replicated to a line card. For example, certain information of database 712 may be replicated to line cards 702-704 and stored in a storage location (not shown) within line cards 702-704. Also note that some or all of the components as shown in FIG. 7 may be implemented in hardware, software, or a combination of both.

Figure 1B:
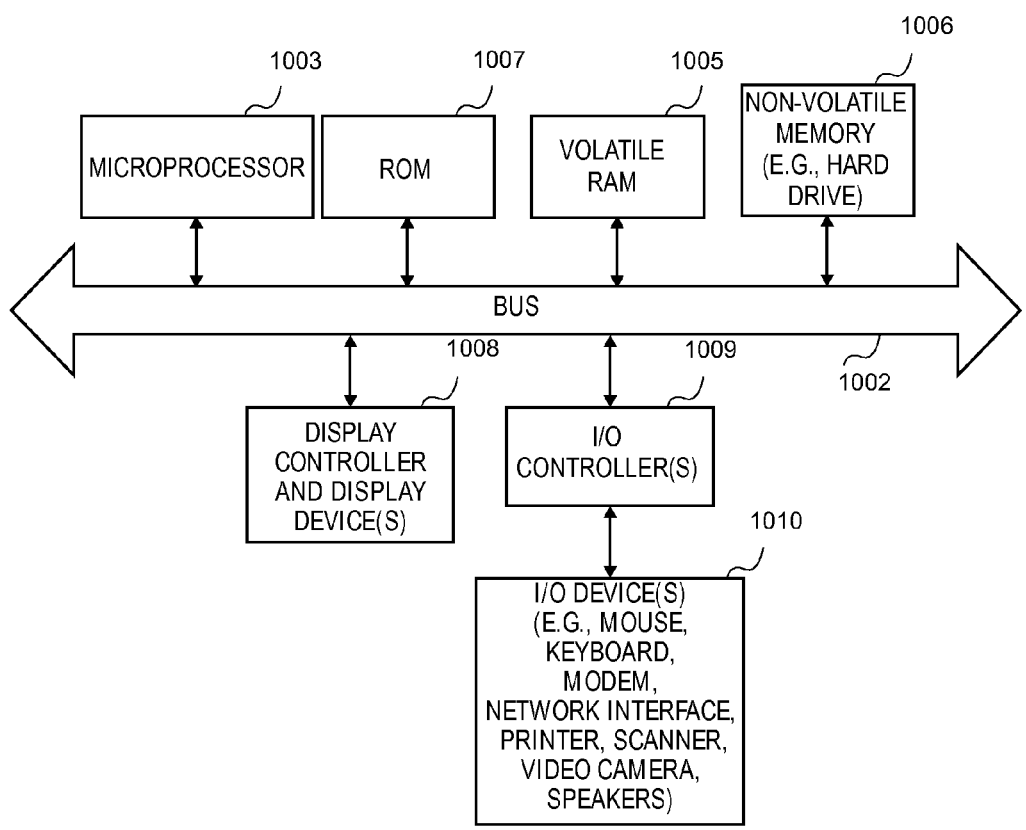
FIG. 1B shows one example of a data processing system according to at least one embodiment.

FIG. 1B shows one example of a data processing system 1100 used to perform the embodiments of the present invention. As shown in FIG. 1B, the data processing system 1100, which is a form of a data processing system, includes a bus 1002 which is coupled to a microprocessor 1003 and a ROM 1007 and volatile RAM 1005 and a non-volatile memory 1006. The microprocessor 1003, which may be, for example, a PPC microprocessor from Motorola, inc., or freescale, or Intel processor, may be coupled to a cache memory (not shown). The bus 1002 interconnects these various components together and also interconnects these components 1003, 1007, 1005, and 1006 to a display controller and display device(s) 1008 and to peripheral devices such as input/output (i/o) devices which may be mice, keyboards, modems, network interfaces, printers, scanners, video cameras, speakers, and other devices which are well known in the art. Typically, the input/output devices 1010 are coupled to the system through input/output controllers 1009. The volatile RAM 1005 is typically implemented as dynamic ram (dram) which requires power continually in order to refresh or maintain the data in the memory. The non-volatile memory 1006 is typically a magnetic hard drive or a magnetic optical drive or an optical drive or a dvd ram or other type of memory systems which maintain data even after power is removed from the system. Typically, the non-volatile memory will also be a random access memory although this is not required.

While FIG. 1B shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1002 may include one or more buses connected to each other through various bridges, controllers and/or adapters as is well known in the art. In one embodiment the I/O controller 1009 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system, or an embedded system, or other data processing system in response to its processor, such as a microprocessor, executing sequences of instructions contained in a memory, such as ROM 1007, volatile RAM 1005, non-volatile memory 1006, or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 1003, or microcontroller.

A machine readable medium can be used to store software and data which when executed by a data processing system causes the system to perform various methods of the present invention. This executable software and data may be stored in various places including for example ROM 1007, volatile RAM 1005, and non-volatile memory 1006 as shown in FIG. 1B. Portions of this software and/or data may be stored in any one of these storage devices.

Thus, a machine readable medium includes any mechanism that provides (e.g., stores and/or transmits) information in a form accessible by a machine (e.g. a computer, network device, cellular phone, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods of the present invention can be implemented using dedicated hardware (e.g., using Field Programmable Gate Arrays (FPGA), or Application Specific Integrated Circuit (ASIC)) or shared circuitry (e.g., microprocessors or microcontrollers under control of program instructions stored in a machine readable medium). Embodiments of the present invention can also be implemented as computer instructions for execution on a data processing system, such as system 1100 of FIG. 1B.

Note that while FIG. 1B illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense. In addition, embodiments of the present invention are not described with reference to any particular programming language. It will be appreciated that a variety of programming languages may be used to implement the teachings of embodiments of the invention as described herein.

What is claimed is:

1. A machine-implemented method, comprising:
    coupling a user equipment (UE) to a radio access network controller of a radio access network, wherein the radio access network controller is communicably coupled to a mobile gateway (MGW) device;
    establishing a secure communication channel between an access point (AP) device associated with a wireless network and the MGW device coupling the AP device with a packet core network, wherein the AP device is communicably coupled to the UE in the wireless network and wherein the MGW device is further communicably coupled to a mobile network gateway of the wireless network;
    authenticating, by a mobile network operator's authentication process, the UE through the established secure communication channel between the MGW device and the AP device, while the UE is roaming in the wireless network;
    generating a mapping between an Internet Protocol (IP) access identifier and a mobile subscriber identifier for the UE;
    storing the mapping between an Internet Protocol (IP) access identifier and a mobile subscriber identifier for the UE at the MGW device;
    provisioning an assigned IP address from the MGW device to the UE using the secure communication channel;
    mapping, by the MGW device, other IP addresses to the assigned IP address; and
    in response to a packet received from the AP device via the secure communication channel, transmitting by the MGW device the packet to the packet core network, wherein the packet is originated from the UE of the wireless network, wherein the MGW manages the mobility of the UE to allow the UE to securely roam between wireless networks operated by the mobile network operator and between the wireless networks and the cellular network, and wherein the assigned IP address is used for both communication with the wireless networks and the cellular network,
    wherein the MGW device determines whether the UE is attempting to establish a connection with the Internet or operator services of the mobile network operator.

2. The method of claim 1, wherein the secure communication channel is an IP secure (IPSec) tunnel established prior to authentication of the UE by the MGW device using the AP device.

3. The method of claim 1, wherein the wireless network is a WiFi network controlled by the AP device.

4. The method of claim 1, wherein in response to the packet received from the UE, the AP device is configured to encrypt the packet using an encryption method compatible with the secure communication channel and to transmit the encrypted packet to the MGW device via the secure communication channel.

5. The method of claim 4, further comprising:
decrypting the encrypted packet by the MGW device; and
transmitting from the MGW device the decrypted packet to a P-GW/GGSN of the packet core network via a GTP tunnel.

6. The method of claim 5, further comprising:
in response to a second packet received from the P-GW/GGSN of the packet core network, encrypting by the MGW device the second packet using an encryption method compatible with the secure communication channel; and
transmitting the encrypted second packet to the AP device via the secure communication channel.

7. The method of claim 6, wherein the AP device is configured to decrypt the encrypted second packet and to transmit the second packet to the UE over the wireless network, such that the UE does not have to handle additional IPSec functionality and the UE battery life is enhanced.

8. The method of claim 1, further comprising:
receiving by the MGW device a device identity associated with the UE encrypted by the AP device;
sending a session request to the packet core network based on the identity;
receiving a session response from the packet core network, the session response including an IP address allocated by the packet core network; and
assigning the IP address to the UE.

9. A non-transitory machine-readable storage medium storing instructions therein, which when executed by a data processing system, cause the data processing system to perform operations comprising:
coupling a user equipment (UE) to a radio access network controller of a radio access network, wherein the radio access network controller is communicably coupled to a mobile gateway (MGW) device;
establishing a secure communication channel between an access point (AP) device associated with a wireless network and the MGW device coupling the AP device with a packet core network, wherein the MGW device is further communicably coupled to a mobile network gateway of the packet core network;
wherein the AP device is communicably coupled to the UE of the wireless network;
authenticating, by a mobile network operator's authentication process, the UE through the established secure communication channel between the MGW and the AP device, while the UE is roaming in the wireless network;
generating a mapping between an Internet Protocol (IP) access identifier and a mobile subscriber identifier for the UE;
storing the mapping between an Internet Protocol (IP) access identifier and a mobile subscriber identifier for the UE at the MGW device;
provisioning an assigned IP address from the MGW device to the UE using the secure communication channel;
mapping, by the MGW device, other IP addresses to the assigned IP address; and
in response to a packet received from the AP device via the secure communication channel, transmitting by the MGW device the packet to the packet core network, wherein the packet is originated from the UE of the wireless network, wherein the MGW manages the mobility of the UE to allow the UE to securely roam between wireless networks operated by the mobile network operator, and wherein the assigned IP address is used for both communication with the wireless networks and the cellular network,
wherein the MGW device determines whether the UE is attempting to establish a connection with the Internet or operator services of the mobile network operator.

10. The non-transitory machine-readable storage medium of claim 9, wherein the secure communication channel is an IP secure (IPSec) tunnel established prior to authentication of the UE by the MGW device using the AP device.

11. The non-transitory machine-readable storage medium of claim 9, wherein the wireless network is a WiFi network controlled by the AP device.

12. The non-transitory machine-readable storage medium of claim 9, wherein in response to the packet received from the UE, the AP device is configured to encrypt the packet using an encryption method compatible with the secure communication channel and to transmit the encrypted packet to the MGW device via the secure communication channel.

13. The non-transitory machine-readable storage medium of claim 12, wherein the method further comprises:
decrypting the encrypted packet by the MGW device; and
transmitting from the MGW device the decrypted packet to a P-GW/GGSN of the packet core network via a GTP tunnel.

14. The non-transitory machine-readable storage medium of claim 13, wherein the method further comprises:
in response to a second packet received from the P-GW/GGSN of the packet core network, encrypting by the MGW device the second packet using an encryption method compatible with the secure communication channel; and
transmitting the encrypted second packet to the AP device via the secure communication channel.

15. The non-transitory machine-readable storage medium of claim 14, wherein the AP device is configured to decrypt the encrypted second packet and to transmit the second packet to the UE over the wireless network, such that the UE does not have to handle IPSec security functionality and the UE battery life is thereby enhanced.

16. The non-transitory machine-readable storage medium of claim 9, wherein the method further comprises:
receiving by the MGW device a device identity associated with the UE encrypted by the AP device;
sending a session request to the packet core network based on the identity;
receiving a session response from the packet core network, the session response including an IP address allocated by the packet core network; and
assigning the IP address to the UE.

17. A network element, comprising:
a processor; and
a memory coupled to the processor for storing instructions, which when executed from the memory, causes the processor to:
couple a user equipment (UE) to a radio access network controller of a radio access network, wherein the radio access network controller is communicably coupled to a mobile gateway (MGW) device;
establish a secure communication channel with an access point (AP) device that is communicably coupled to the UE in a wireless network, wherein the MGW device is further communicably coupled to a mobile network gateway of the wireless network;

authenticate, by a mobile network operator's authentication process, the UE through the established secure communication channel between the MGW device and the AP device, while the UE is roaming in the wireless network;

generate a mapping between an Internet Protocol (IP) access identifier and a mobile subscriber identifier for the UE;

store the mapping between an Internet Protocol (IP) access identifier and a mobile subscriber identifier for the UE at the MGW device;

provision an assigned IP address from the MGW device to the UE using the secure communication channel;

map, by the MGW device, other IP addresses to the assigned IP address; and in response to a packet received from the AP device via the secure communication channel, transmit the packet to a packet core network, wherein the packet is originated from the UE of the wireless network, wherein the MGW manages the mobility of the UE to allow the UE to securely roam between wireless networks operated by the mobile network operator, and wherein the assigned IP address is used for both communication with the wireless networks and the cellular network, wherein the MGW device determines whether the UE is attempting to establish a connection with the Internet or operator services of the mobile network operator.

18. The network element of claim 17, wherein the secure communication channel is an IP secure (IPSec) tunnel established prior to authentication of the UE by the MGW device using the AP device.

19. The network element of claim 17, wherein the wireless network is a WiFi network controlled by the AP device.

20. The network element of claim 17, wherein in response to the packet received from the UE, the AP device is configured to encrypt the packet using an encryption method compatible with the secure communication channel and to transmit the encrypted packet to the network element via the secure communication channel.

21. The network element of claim 20, wherein the processor is further configured to:
decrypt the encrypted packet by the MGW device; and
transmit from the MGW device the decrypted packet to a P-GW/GGSN of the packet core network via a GTP tunnel.

22. The network element of claim 21, wherein the processor is further configured to:
in response to a second packet received from the P-GW/GGSN of the packet core network, encrypt by the MGW device the second packet using an encryption method compatible with the secure communication channel; and
transmit the encrypted second packet to the AP device via the secure communication channel.

23. The network element of claim 17, wherein the AP device is configured to:
decrypt the encrypted second packet; and
transmit the second packet to the UE over the wireless network, such that the UE does not have to handle IPSec security functionality and UE battery life is enhanced.

24. The network element of claim 17, wherein the processor is further configured to:
receive by the MGW device a device identity associated with the UE from the AP device;
send a session request to the packet core network based on the identity;
receive a session response from the packet core network, the session response including an IP address allocated by the packet core network; and
assign the IP address to the UE.

25. The method of claim 1, wherein the MGW device determines whether the UE is attempting to establish a communication path to the Internet or to the packet core network.

26. The method of claim 1, wherein the MGW devices determines whether to divert data directly to the Internet.

* * * * *